(12) United States Patent
Kanno et al.

(10) Patent No.: US 7,585,215 B1
(45) Date of Patent: Sep. 8, 2009

(54) GAME DEVICE

(75) Inventors: Kenji Kanno, Tokyo (JP); Masaaki Ito, Tokyo (JP); Toshikazu Goi, Tokyo (JP)

(73) Assignee: Kabushiki Kaisha Sega, Tokyo (JP)

( * ) Notice: Subject to any disclaimer, the term of this patent is extended or adjusted under 35 U.S.C. 154(b) by 0 days.

(21) Appl. No.: 09/444,293

(22) Filed: Nov. 22, 1999

(30) Foreign Application Priority Data

Nov. 24, 1998 (JP) .................................. 10-333116

(51) Int. Cl.
*A63F 9/24* (2006.01)
*A63F 13/00* (2006.01)
*G06F 17/00* (2006.01)
*G06F 19/00* (2006.01)

(52) U.S. Cl. .................... 463/6; 463/1; 463/30; 463/34; 434/29; 434/372; 434/373; 345/419; 345/473; 345/474; 345/475

(58) Field of Classification Search ................. 463/1–6, 463/30–34, 42; 701/1, 3; 434/29, 372, 373; 345/473–475, 427, 419, 418, 619, 649, 949
See application file for complete search history.

(56) References Cited

U.S. PATENT DOCUMENTS

| 3,717,345 | A |   | 2/1973  | Banville            |         |
|-----------|---|---|---------|---------------------|---------|
| 4,643,421 | A | * | 2/1987  | Meyer et al.        | 273/1   |
| 4,846,686 | A | * | 7/1989  | Adams               | 434/69  |
| 5,566,280 | A | * | 10/1996 | Fukui et al.        | 345/419 |
| 5,577,913 | A | * | 11/1996 | Moncrief et al.     | 434/69  |
| 5,577,961 | A | * | 11/1996 | Adamczyk et al.     | 463/33  |
| 5,971,853 | A | * | 10/1999 | Kataoka et al.      | 463/36  |
| 5,993,315 | A | * | 11/1999 | Strider et al.      | 463/1   |
| 5,993,318 | A |   | 11/1999 | Kousaki             |         |
| 6,034,693 | A | * | 3/2000  | Kobayashi et al.    | 345/582 |

(Continued)

FOREIGN PATENT DOCUMENTS

JP          08-117440          5/1996

(Continued)

OTHER PUBLICATIONS

'Hard Truck', 2000, Softlab-Nsk Ltd., www.softlab-nak.com/pro/truck/html, pp. 1-3.*

(Continued)

*Primary Examiner*—John M Hotaling, II
*Assistant Examiner*—Adetokunbo Torimiro
(74) *Attorney, Agent, or Firm*—Finnegan, Henderson, Farabow, Garrett & Dunner, L.L.P.

(57) ABSTRACT

Provided is a game device which determines the goal point pursuant to the game progress and not in advance. The game device 1 is a game for competing for game scores in accordance with the superiority of the state of arrival upon the taxi, which is the moving object, reaching a goal. This game device 1 is a game wherein a presentation unit for presenting a goal determining element (passenger), which becomes the objective upon a taxi moving in the game space 511 (S104, S105), and judgment unit for determining the game results by judging the superiority of the state of arrival in accordance with such selected goal determining element upon selecting one goal among a plurality of goals (S105; YES) provided by the presentation unit (S104, S105) are processed by the CPU and displayed on the display.

8 Claims, 10 Drawing Sheets

U.S. PATENT DOCUMENTS

| | | | |
|---|---|---|---|
| 6,040,841 A * | 3/2000 | Cohen et al. | 345/473 |
| 6,126,545 A * | 10/2000 | Takahashi et al. | 463/32 |
| 6,171,186 B1 | 1/2001 | Kurosawa et al. | |
| 6,226,008 B1 * | 5/2001 | Watanabe et al. | 345/427 |
| 6,256,040 B1 | 7/2001 | Tanaka et al. | |
| 6,283,857 B1 * | 9/2001 | Miyamoto et al. | 463/31 |
| 6,632,138 B1 | 10/2003 | Serizawa et al. | |
| 6,686,918 B1 * | 2/2004 | Cajolet et al. | 345/473 |
| 6,763,273 B2 | 7/2004 | Chudley et al. | |

FOREIGN PATENT DOCUMENTS

| | | |
|---|---|---|
| JP | 409000734 A * | 1/1997 |
| JP | 10-137445 | 5/1997 |
| JP | 10-113468 | 5/1998 |

OTHER PUBLICATIONS

'Hard Truck', 2001, Buka Entertainment, www.buka.com/sripts/game.asp?id=2, pp. 1-3.*

Thunder Truck Rally, Psygnosis, Jun. 1997, <www.hogansalley.com/sonypsx/thunder.txt>.*

Microprose (MechWarrior 3 Game Manual. May 31, 1999. http://images.trygames.com/manuals/Mechwarrior_3.pdf).*

Activision (Mechwarrior 2 Game Manual. Jun. 30, 1995. http://downloads.planetmirror.com/pub/replacementdocs/MechWarrior_2_-_Manual_-_PC.pdf.*

Microprose, MechWarrior 3 Game Manual. May 31, 1999. (http://images.trygames.com/manuals/Mechwarrior_3.pdf).*

Thunder Truck Rally, Psygnosis. Jun. 1997. (http://www.seanet.com/~greg).*

Rockstar Games, Midnight Club 2 Manual, Jun. 30, 2003, http://downloads.planetmirror.com/pub/replacementdocs/Midnight_Club_II_-_Manual_-_XBX.pdf.

Gamespot, Midnight Club 2, release date Jan. 19, 2008, http://www.gamespot.com/pc/driving/midnightclub2/index.html?=midnight%20club%202.

Rockstar Games, Midnight Club II, Apr. 8, 2003.

Gamespot, "Grand Theft Auto III Gameguide," Game was released Oct. 22, 2001, Rockstar Games, Supplementary Income section, http://www.gamespot.com/gamespot/gameguides/all/gtaiii/p5_01.html (3 pages).

* cited by examiner

GAME DEVICE

BACKGROUND OF THE INVENTION

1. Field of the Invention

The present invention generally relates to a game device and image processing device wherein players compete for game scores in accordance with the superiority of the state of arrival upon a moving object reaching a goal. The present invention particularly relates to a game device wherein the player himself/herself selects the goal determining element, which becomes the objective of the moving object moving in a game space, and game scores are determined in accordance with the state of reaching such selected goal.

2. Description of the Related Art

Conventionally, this type of game device has been known as a device which provides a game for a player to compete for game scores in accordance with the superiority of the state of arrival upon a moving object such as a race car reaching a goal.

By utilizing this game device, a player simulation drives the moving object such as a race car along a predetermined course, and endeavors to pass this moving object through a checkpoint within a predetermined time limit in accordance with such course. The player thereby competes for game scores obtainable in accordance with points received upon the moving object passing through the checkpoint and the superiority of the state of arrival upon such moving object reaching the goal.

Nevertheless, according to the aforementioned game device, the goal of the moving object is predetermined and the player always proceeds to the same goal. This results in a problem of the game progress becoming monotonous, and the player may not enjoy a variation in the game.

Further, according to the aforementioned game device, the display position of the screen was determined in advance without consideration to the player's preference, and the display screen therefore lacked reality and sense of speed.

Moreover, according to the aforementioned game device, only images seen from a predetermined angle were displayed when driving the moving object in reverse. This results in a problem of the image lacking reality, and hinders the player from driving the moving object in reverse.

SUMMARY OF THE INVENTION

In other words, an object of the present invention is to provide a game device which determines the goal point pursuant to the game progress and not in advance. Another object of the present invention is to provide a game device capable of displaying the game display screen from a viewpoint preferred by the player. Still another object of the present invention is to provide a game device capable of displaying the reverse movement of the moving object from the player's line of sight pursuant to such reverse movement.

In order to achieve the aforementioned objects, the present invention is a game device for competing for game scores in accordance with the superiority of the state of arrival upon a moving object reaching a goal, the game device comprising: presentation means for presenting a goal determining element, which becomes the objective of the moving object moving in a game space; and judgment means for determining game scores by judging the superiority of the state of arrival in accordance with the selected goal determining element upon selecting one among a plurality of goal determining elements provided by the presentation means.

The presentation means is for presenting a simulation road regarding the game space, a simulation taxi regarding the moving object, and a simulation taxi passenger regarding the goal determining element; and the judgment means is capable of judging whether a moving object reaches the goal within a prescribed time limit of a game determined per passenger with respect to the superiority of the state of arrival, and determining the superiority of the game results by accumulating the tips obtainable upon the competition with other moving objects.

The judgment means comprises: a time meter capable of judging whether a moving object reaches the goal within a prescribed time limit of a game determined per passenger with respect to the superiority of the state of arrival; and a tip meter capable of determining the superiority of the game results by accumulating the tips obtainable upon the competition with other moving objects.

The time meter is means for representing the index with respect to the remaining time in the overall game, and the tip meter is means for representing the index with respect to the elapsed time per passenger.

In order to achieve the aforementioned objects, the present invention is a game device for displaying images from a forward movement virtual camera taken from a prescribed viewpoint upon a moving object moving in the game space, and provided with a reverse movement exclusive virtual camera for exclusively showing a reverse movement, the game device comprising: reverse movement selection means for selecting the reverse movement of the moving body; and switching means for detecting the operation of the reverse movement switching means and switching the virtual camera to the reverse movement exclusive virtual camera.

The reverse movement exclusive virtual camera is positioned to the rear of and higher than the forward movement camera, and shows the rear of the moving object from a viewpoint which moves together with the moving object.

In order to achieve the aforementioned objects, the aforementioned virtual cameras comprise viewing angle adjustment means for adjusting the viewing angle showing the game space and objects, and adjusting the viewing angle pursuant to the player's preference.

The present invention is also a storage medium which stores a program for making a computer execute the aforementioned game.

Here, storage medium is a medium storing information (mainly digital data and programs) by some type of physical means, and is capable of making processing devices such as a computer or dedicated processor execute prescribed functions. In other words, any medium capable of downloading a program to a computer with some means and making such computer execute prescribed functions will suffice. For example, such medium includes a flexible disk, hard disk, magnetic tape, magnetic disk, CD, CD-ROM, DVD-RAM, DVD-ROM, DVD-R, PD, MD, DCC, ROM cartridge, RAM memory card with battery backup, flash memory cartridge, non-volatile RAM cartridge, etc. Further, situations where data is received from a computer via wireless or radio communication circuits (public circuits, data dedicated circuits, satellite circuits, etc.) shall also be included herein. The so-called Internet is also included in the storage medium referred to herein.

DESCRIPTION OF THE PREFERRED EMBODIMENT

Figure 1:
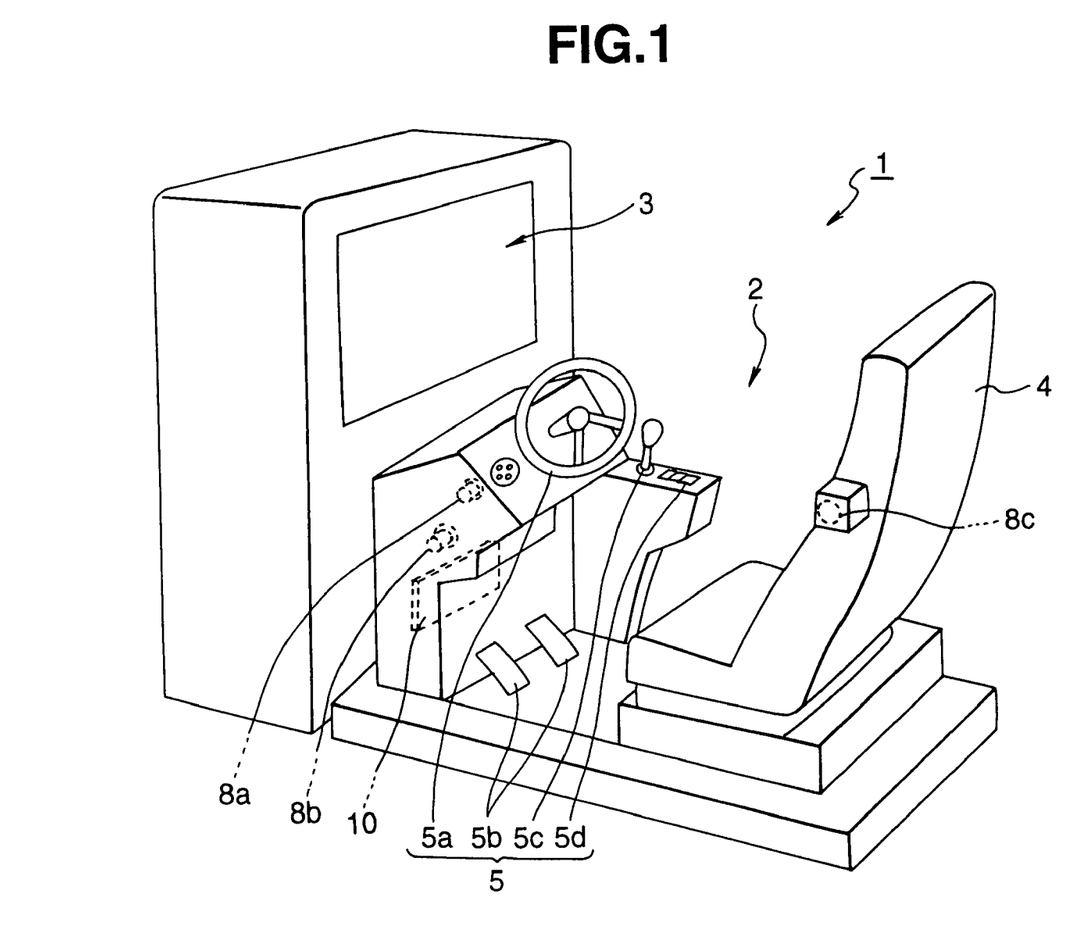
FIG. 1 is a perspective view showing the game device according to the present invention.

The preferred embodiment of the present invention is now explained with reference to the relevant drawings. FIG. 1 is a perspective view showing an embodiment of the driving game device according to the present invention. In FIG. 1, reference numeral 1 shows the game device main body.

This game device main body 1 is structured of a housing 2 imitating the shape of the driver's seat of a car and a display 3 provided to the front of the housing 2. This housing 2 is structured of a seat 4 to which the player sits and an operation device 5 provided to the front of the seat 4. Although not shown, a reverse movement vibration generator is provided to the seat 4 of the housing 2 and a forward movement vibration generator is provide to the operation device 5. This enables the player to experience a realistic vibration upon the vibration detection being conducted.

Speaker mounting holes are arranged on both sides of the front face to which the operation device 5 of the housing 2 is provided, and a background music speaker 8a and sound effect speaker 8b are provided within such holes. Speaker boxes are arranged on both sides of the seat 4 of the housing 2 and sound effect speakers 8c are provided inside such speaker boxes.

Arranged on the operation device 5 provided to the housing are a steering wheel 5a, accelerator and brake 5b, shift bar 5c, and operation switch 5d such as a view change switch and selection switch. A game processing board 10 and other circuits are arranged inside the housing 2. The player makes free use of the operation devices such as the steering wheel and plays the taxi driving game displayed on the display.

Figure 2:
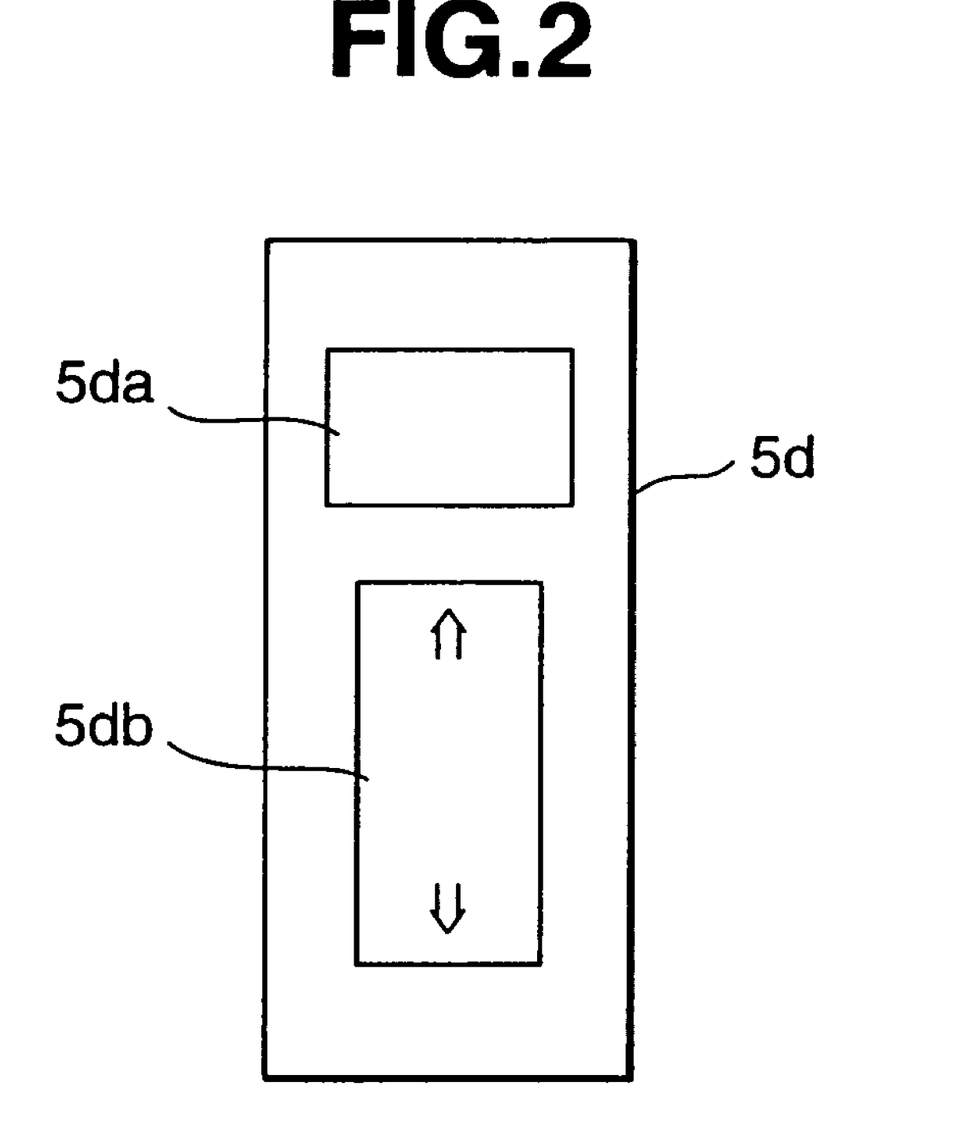
FIG. 2 is a plane view showing a structural example of the operation switch of the game device according to the present invention.

FIG. 2 is a plane view showing the details of the operation switch 5d. In FIG. 2, the door switch 5da within the operation switch 5d is for designating the passenger to board the taxi (determination of goal determining element). The view-change switch 5db within the operation switch 5d inclines frontward and backward, and during the period such switch is pressed toward the inclined frontward or backward position, it is capable of outputting the ON state, for example. Therefore, it is possible to use this view-change switch 5db so as to change the viewing angle to become smaller while such button is pressed frontward, and to change the viewing angle to become larger while such button is pressed backward.

Figure 3:
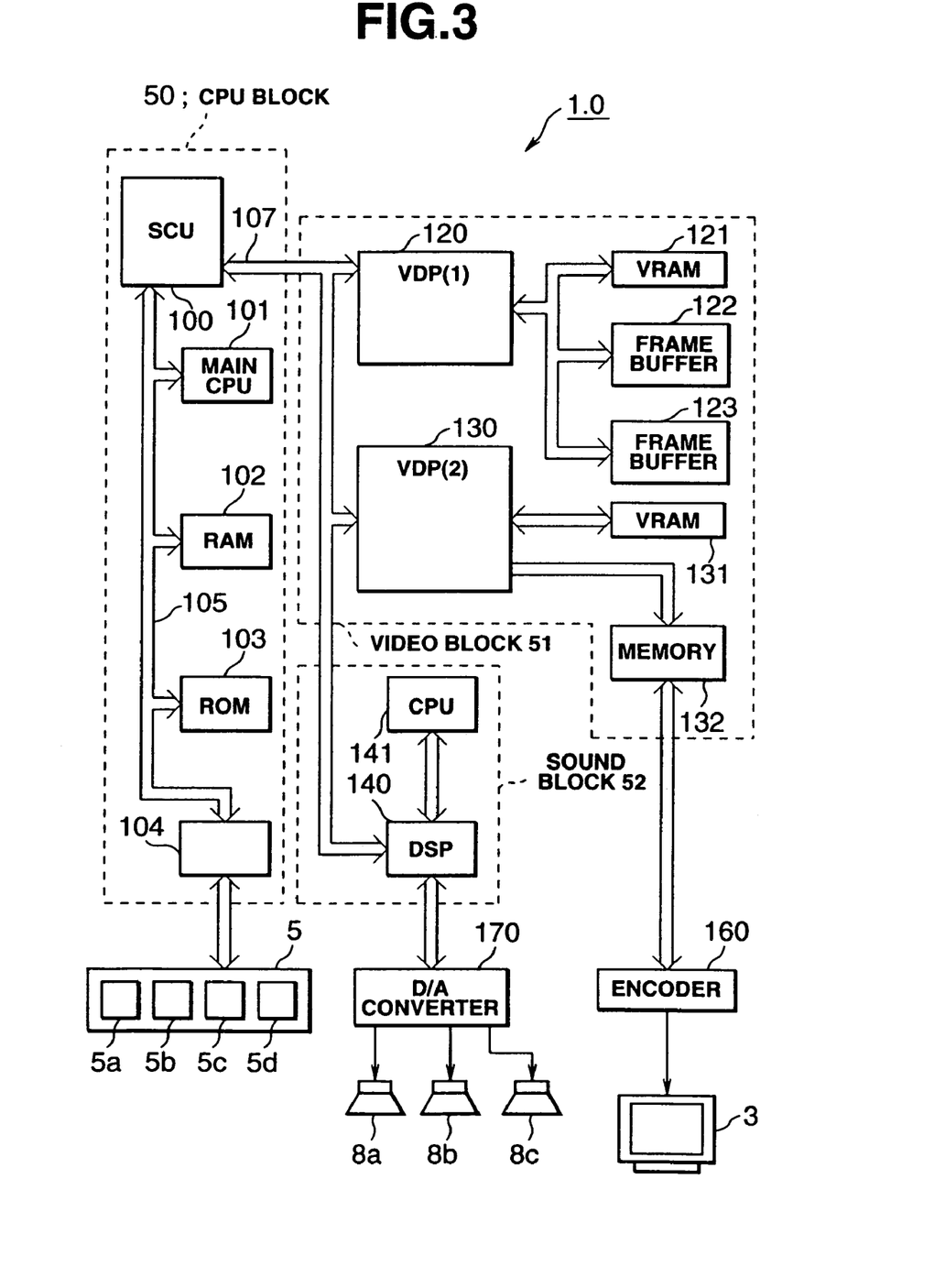
FIG. 3 is a block diagram showing a structural example of the game processing board of the game device according to the present invention.

FIG. 3 is a block diagram showing the game processing board 10 of the game device according to the present embodiment. In FIG. 3, the game processing board 10 is structured of a CPU block 50, video block 51, sound block 52, encoder 160, and D/A converter 170.

The aforementioned CPU block 50 is structured of an SCU (System Control Unit) 100, main CPU (Central Processing Unit) 101, main memory (RAM) 102, ROM 103, and input interface 104.

The aforementioned SCU 100 is capable of controlling the transmission/reception of data by assigning a bus-exclusive time to the devices mutually connected via the busses. The CPU 101 executes the initial program stored in the ROM 103 upon the power being turned on, and initializes the entire device. Thereafter, the CPU 101 develops on the main memory (RAM) 102 a prescribed operating system or game processing program from the ROM 103, executes such system or game processing program and processes the game development, and orders the preparation of pictures and sounds. The CPU 101 is capable of providing sound data to the sound block 52 and controlling the operation thereof. The CPU 101 is further capable of processing the game processing program based on the input data from the I/O interface 104 and realizing a prescribed game development.

The main memory (RAM) 102 mainly works as the work memory for storing the aforementioned operating system and game processing program. The ROM 103 stores the initial program, operating system, and game processing program.

The I/O interface 104 is connected to the steering wheel 5a, pedal terminal 5b, shift lever 5c, operation switch 5d, etc. of the operation device 5. Thereby, the operation signals of the steering wheel 5a, pedal terminal 5b, shift lever 5c, operation switch 5d, etc. of the operation device 5 are read by the CPU 101 as digital data. Further, a vibration device not shown is connected to the I/O interface 104. Thus, the I/O interface 104 activates the vibration generator pursuant to the vibration order from the CPU 101 and the seat 4 and/or operation device 5 of the housing 2 is vibrated in accordance with the contents of the game.

The video block 51 comprises a VDP (Video Display Processor) 120 for drawing characters and the like made from polygon data of a video game, and a VDP 130 for drawing background images and performing synthesizing clipping processing to polygon image data and background images. The VDP 120 is connected to the VRAM 121 and frame buffers 122, 123. The drawing data of polygons representing the character of a video game machine is sent from the main CPU 101 to the SCU 100 via the VDP 120, and written to the VRAM 121. The drawing data written to the VRAM 121 is, for example, drawn to frame buffer 122 or 123 in a 16- or 8-bit/pixel format. Data drawn to frame buffer 122 or 123 is sent to the VDP 130. Information for controlling the drawing is provided to the VDP 120 from the main CPU 101 via the SCU 100. The VDP 120 thereby executes the drawing processing pursuant to such instructions.

The VDP 130 is connected to the VRAM 131, and the image data output from the VDP 130 is output to the encoder 160 via the memory 132. The encoder 160 generates picture signals by adding synchronization signals etc. to this image data, and outputs this to the display 3. Thereby, the game screen is displayed on the display 3.

The sound block 52 is structured of a DSP 140 which synthesizes sounds pursuant to the PCM format or FM format, and a CPU 141 which controls this DSP 140. Sound data generated by the DSP 140 is output to speakers 8a, 8b, 8c after being converted to a plurality of channel signals by the D/A converter 170.

Figure 4A:
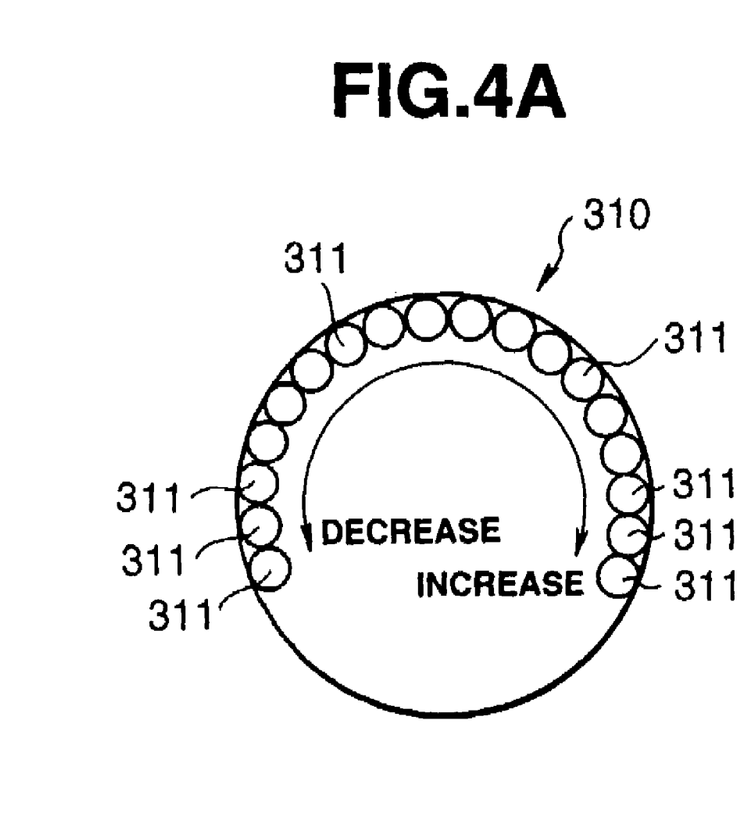
FIG. 4 is a plane view showing the tip meter and time meter used in the game device.
Figure 4B:
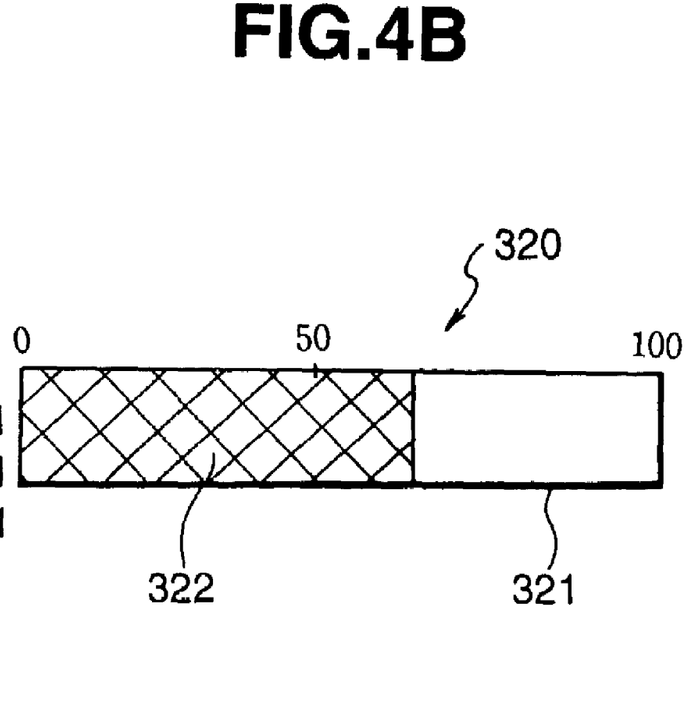

FIG. 4 shows a tip meter and time meter, which displays the game time, to be displayed on the display, and FIG. 4A shows the tip meter and FIG. 4B shows the time meter.

In FIG. 4A, the tip meter 310 is shaped such that display points 311, 311, 311 are arranged in a circle, and such display points 311, 311, 311 successively light up upon the player obtaining tips (additional points) during the game development.

Figure 5:
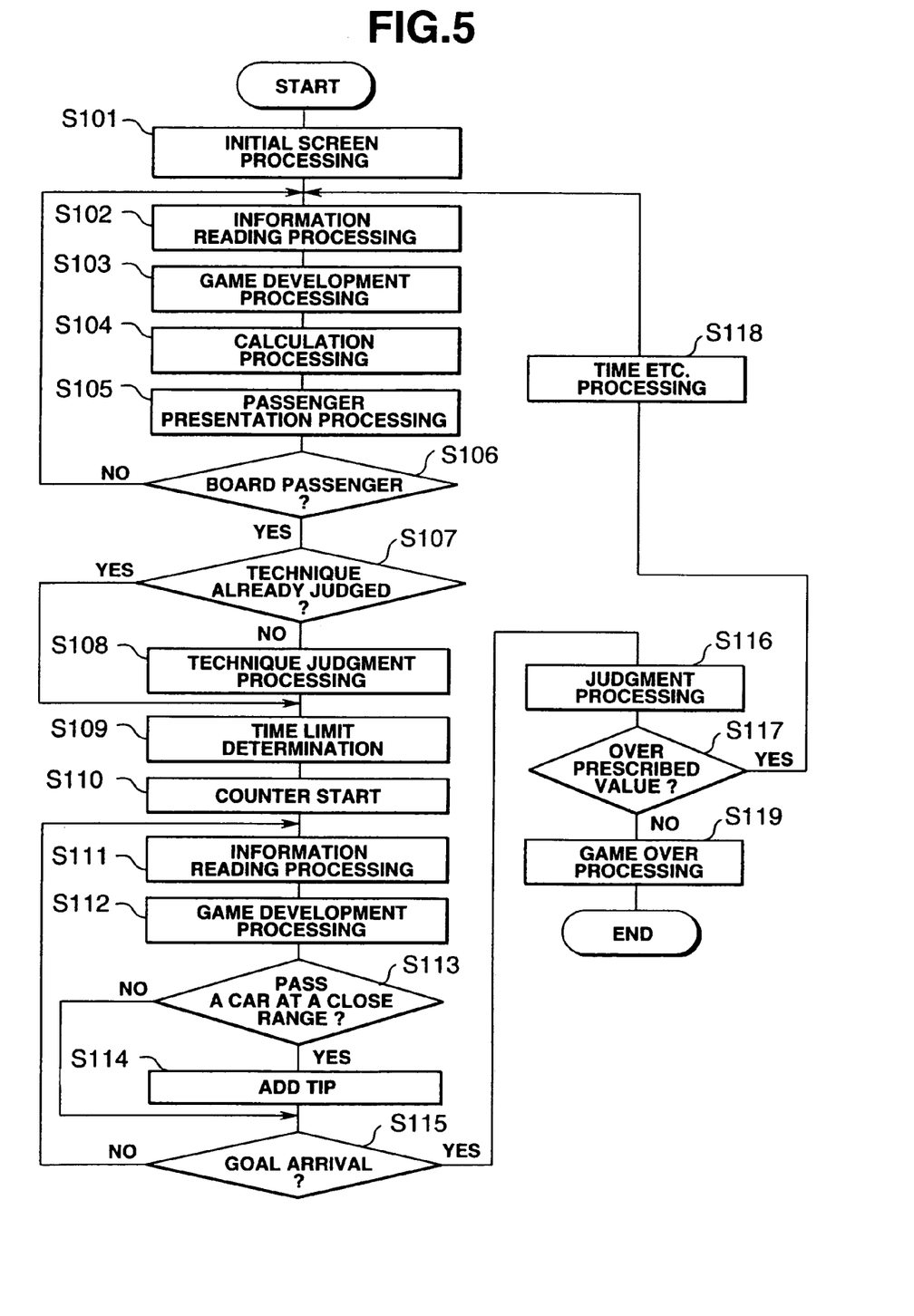
FIG. 5 is a flowchart showing the action of the game device.
Figure 6:
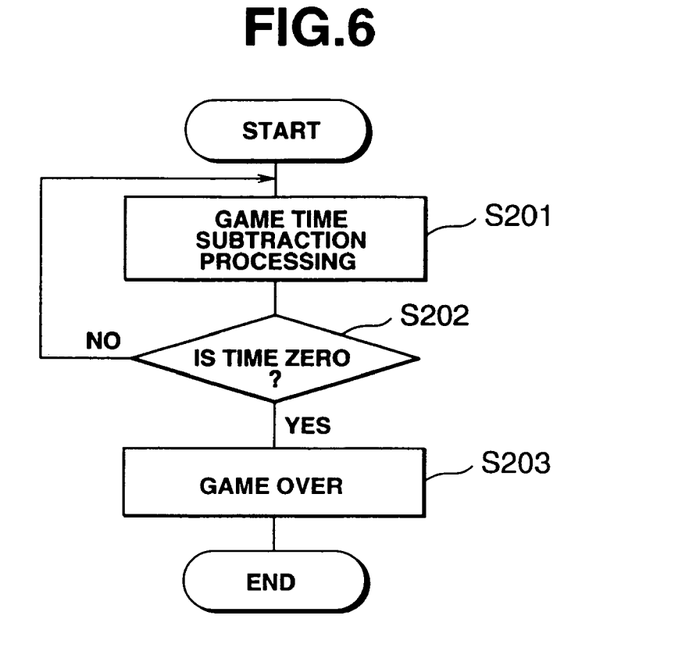
FIG. 6 is a flowchart for explaining the time management of the game device.

The game operation of this type of game device is hereinafter explained with reference to FIGS. 5 and 6, based on FIG. 1 through 4. Here, FIG. 5 is a flowchart showing the game processed by the game device. FIG. 6 is a flowchart showing the management of the game time.

Upon starting the game, the CPU 101 of the CPU block 50 executes the processing for displaying the initial screen (S101 of FIG. 5). Thereby, the initial screen is displayed from the video block 51 to the display 3, and the sound signals are provided to the speakers 8a, 8b, 8c from the sound block 52 via the D/A converter 170. Further, the game time is set to the game meter 320.

The CPU 101 executes a game time management flowchart separate from the aforementioned flowchart. That is, the CPU 101 subtracts the provided game time pursuant to the game progress (S201, S202 of FIG. 6; NO) and, when the game time runs out (S202; YES), compulsorily ends the game (S203 of FIG. 6). The CPU 101 orders the video block 51 to display this subtraction result (S201) on the time meter 320. Thus, displayed on the time meter 320 displayed on the display 3 is a state where the game time gradually decreases.

Next, the CPU 101 of the CPU block 50 reads operation signals from the steering wheel 5a, pedal terminal 5b, shift lever 5c and operation switch 5d of the operation device 5 via the I/O interface 104 (S102). Further, the CPU 101 of the CPU block 50 executes the program and develops the game pursuant to such operation signals (S103). Thereby, shown on the display 3 are images of a taxi cruising down a street and sounds corresponding to such screen are output from the speakers 8a, 8b, 8c.

Thereafter, the CPU 101 of the CPU block 50 orders the preparation of images of a taxi cruising down such street (S102~S103) as well as determines taxi passengers (goal determining element) to be displayed on the screen by random calculation (S104). This is in order to prevent the player from learning the goal conditions etc., as it may be possible if the same person is always displayed upon the start of a game.

The CPU 101 provides the passenger (goal determining element) information calculated and determined by the CPU 101 to the video block 51 and orders the display of such passenger (S105). The video block 51 thereby performs the processing for displaying such passenger on the display 3 and provides this to the display 3.

The player orders whether to board the taxi passenger displayed on the screen with the operation of the steering wheel 5a of the operation device 5 and the door switch 5da (S106). That is, if the player decides not to board the passenger (S106; NO), he/she operates the steering wheel 5a such that the taxi does not approach the passenger side. Contrarily, if the player decides to board the passenger, he/she approaches the passenger by operating the steering wheel 5a, stops the taxi by operating the pedal terminal 5b, and presses the door switch 5da.

If the player decides not to board the passenger at this time (S106; NO), the CPU 101 reads the operation signals from the steering wheel 5a, pedal terminal 5b, shift lever 5c and operation switch 5d of the operation device 5 via the I/O interface 104 (S102). The CPU 101 of the CPU block 50 executes the program and develops the game based on such operation signals (S103). Thereby, shown on the display 3 are images of a taxi cruising down a street and sounds corresponding to such screen are output from the speakers 8a, 8b, 8c.

Once again, excluding the taxi passenger displayed in the preceding step, the CPU 101 of the CPU block 50 determines the taxi passenger to be displayed on the screen by random calculation (S104), and displays such passenger (S105).

Here, the player determines once again whether to board the passenger (S106). In the aforementioned explanation, discussed was the situation when a player decided not to board the passenger (S106), so discussed below is the situation when a player decides to board the passenger (S106; YES).

In other words, when the player decides to board the passenger (S106; YES), he/she operates the steering wheel 5a to approach the passenger side, stops the taxi by operating the pedal terminal 5b, and presses the door switch 5da. The CPU 101 of the CPU block 50 thereby reads such information via the I/O interface 104, and detects that such passenger has been selected. Thereupon, the CPU 101 lights up a prescribed number of display points 311 on the tip meter 310.

Then, the CPU 101 foremost judges whether the player's driving technique has been measured (S107). Here, when the CPU 101 judges that the player's driving technique has not yet been measured (S107; NO), the CPU 101 judges the driving technique based on the information relating to the player's driving technique obtained from the operation in steps S102~S106 (S108). Assuming, for example, that the player's driving technique has been previously measured and such information is available, the CPU 101 does not measure the player's driving technique (S107; YES). Moreover, the player's driving technique is determined, for example, by measuring in advance the time required to reach a certain point from a different point displayed on the display 3, and ranking such time.

The CPU 101 then determines the goal point and time limit in accordance with such goal point (S109) based on the information relating to the driving technique judged at step S108 or information related to the previously obtained driving technique, and the information of the selected taxi passenger. When the CPU 101 determines the above, the CPU 101 orders the video block 51 to display the time limit of the game on the time meter 320. The CPU 101 then starts the game and the counter (s110).

Next, the CPU 101 of the CPU block 50 reads operation signals from the steering wheel 5a, pedal terminal 5b, shift lever 5c and operation switch 5d of the operation device 5 via the I/O interface 104 (S111). The CPU 101 of the CPU block 50 executes the program and develops the game based on such operation signals (S112). Thereby, shown on the display 3 are images of a taxi travelling toward the goal while boarding a passenger and sounds corresponding to such screen are output from the speakers 8a, 8b, 8c.

During the aforementioned game development, the CPU 101 judges whether the taxi passed any other cars at a close range (S113). If the taxi passed by other cars at a close range (S113; YES), the CPU 101 determines that the driving technique is good and orders the tip meter 310 to add and display the tip (S114). The video block 51 thereby prepares a screen wherein the tip meter 310 lights up the display point 311 and provides this to the display 3. Contrarily, if the taxi did not pass by other cars at a close range (S113; NO), no tip is added and the CPU 101 moves to the next step.

The CPU 101 then judges whether the taxi has reached the goal (S115). If the CPU 101 judges that the taxi has not yet reached the goal (S115; NO), the CPU once again continues the processing steps from S111 to S115.

Here, if the CPU judges that the taxi has reached the goal (S115; YES), the CPU 101 judges the superiority of the state of arrival (S116) in accordance with the selected goal determining element based on the counter and number of tips, etc. Thereupon (S116), if the actual driving time is less than the time limit of the game determined in accordance with the passenger or player's driving technique, the display points 311 of the tip meter 310 are lit up in accordance with such time. The player is thereby able to add points to his/her score.

If the judgment results of the superiority of the state of arrival in step S116 exceeds a prescribed value (S117; YES), the game time, if remaining, is accumulated (S118), and it is possible to return to step S102 and start the taxi game from the beginning. Further, as information of the player's driving technique can be obtained during steps S111 to S116, here, the CPU 101 renews the player's driving technique (S116). When restarting the game by returning to step S102 (S117; YES), the accumulated tips are reset, and the display points 311 of the tip meter 310 will all disappear.

On the other hand, if the judgment results of the superiority of the state of arrival in step S116 is less than a prescribed value (S117; NO), the CPU 101 orders a game over display (S119), and ends the game.

In this type of game device, the driving time until boarding the passenger is measured and ranked, and the player's driving technique is ranked as well. Thus, when the goal point is determined upon boarding a passenger, an adequate time limit of the game until the goal point is set in accordance with such driving technique.

Further, in this game device, when a player drives the taxi to the goal point and reaches such goal within the time limit, the player's driving technique is re-ranked in accordance with the remaining time and is reflected in the game development and in the time limit of the game thereafter. Therefore, as the goal point and time limit may be set in accordance with the player's driving technique, it is possible for both the advanced player and beginner player to enjoy the game as an adequate time limit is set thereby.

If the game time remains during the play of the aforementioned game, such remaining time may be added to the time limit of the next game.

In the aforementioned game device, the goal point is not unconditionally determined in advance, and is determined for the first time upon boarding the passenger. Moreover, the time limit of the game is set in consideration of the player's driving technique and the player drives the taxi toward such goal point. As the game is developed with tips obtained during such driving and the game time obtained pursuant to the goal point, the game development has diversity. Further, there is the advantage that the amusement of the game is enhanced due to the game development being influenced by unexpectedness and the player's driving technique.

Figure 7:
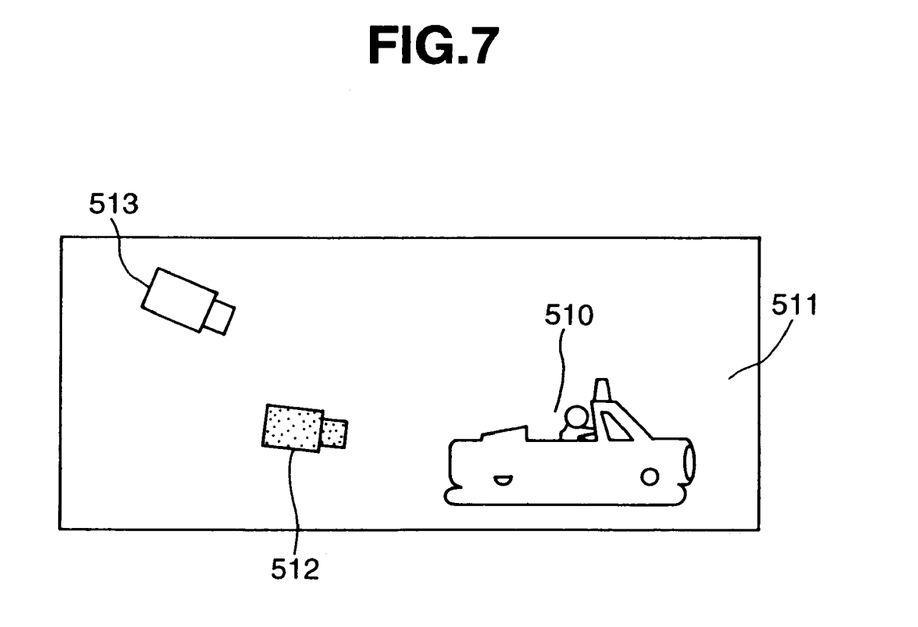
FIG. 7 is an explanatory diagram showing the position relationship between the moving object, forward movement virtual camera and reverse movement exclusive virtual camera.

FIG. 7 is a diagram explaining the positional arrangement of the forward movement camera, reverse movement camera, and taxi. In FIG. 7, the game device 1 displays the picture upon reverse movement to the display 3 based on picture information obtained as follows. That is, in FIG. 7, the game device 1 arranges the taxi 510, which is the moving object, to the inside of the game space 511, and obtains picture information of a state where the taxi 510 moving inside the game space 511 is viewed with the forward movement virtual camera 512 from a prescribed viewpoint. This obtained picture information is displayed on the display 3 of the game device 1 pursuant to the game development.

This game device 1 is further capable of, upon driving the taxi in reverse, displaying on the display 3 the picture information obtained by viewing with the reverse movement exclusive virtual camera 513, which is exclusively for viewing the reverse movement, with the arrangement in FIG. 7. At such time, the reverse movement exclusive virtual camera 513 is positioned at the back of and higher than the forward movement virtual camera 512, and the game device 1 displays on the display 3 picture information obtained from a state wherein the rear of the taxi 510 is viewed from a viewpoint which moves together with the taxi 510.

Figure 8:
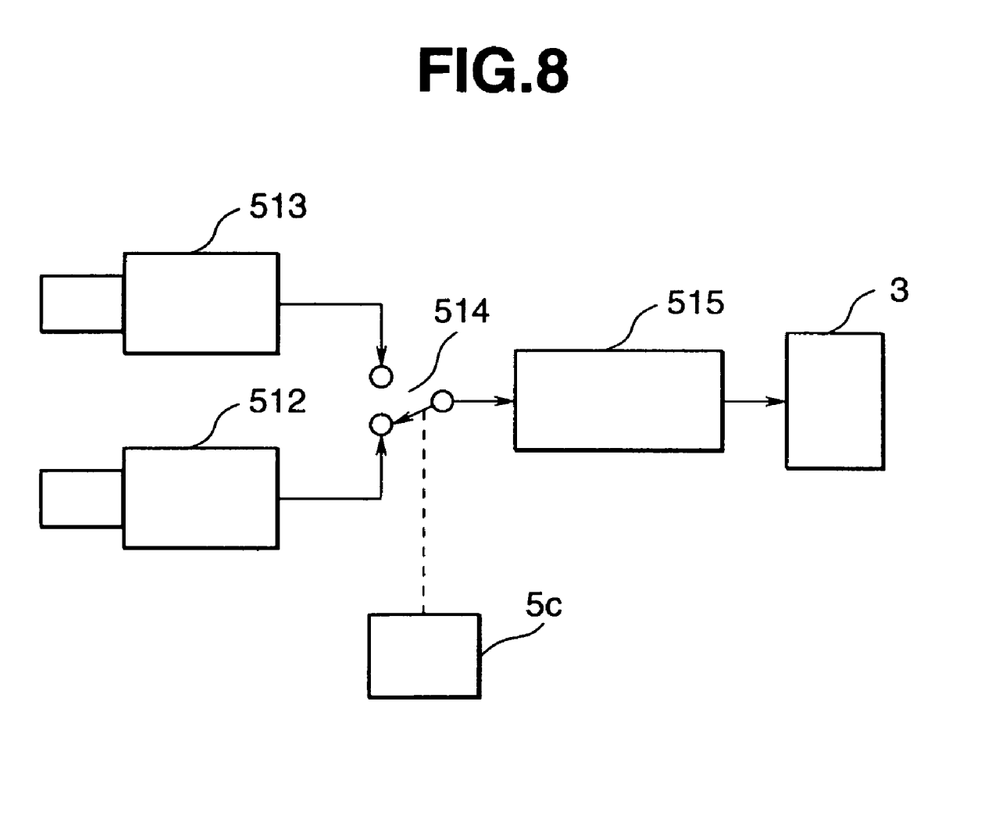
FIG. 8 is a conceptual diagram showing a structural example of the game device for switching the forward movement virtual camera and reverse movement exclusive virtual camera.

FIG. 8 is a conceptual diagram showing an example for obtaining image information on the display by using the reverse movement exclusive virtual camera. In FIG. 8, the game device 1 is realized by the shift lever 5c, which is the rear movement selection means for selecting the reverse movement of the taxi 510, switching means 514 for reading the operation information of such shift lever 5c via the I/O interface 104 and switching from the forward movement virtual camera 513 to the reverse movement exclusive virtual camera 512 upon detecting that it is a reverse movement, image processing means 515 for processing the picture information from the camera 512 or 513, and display 3 for displaying the picture from such image processing means 515. Moreover, the forward movement virtual camera 512, reverse movement exclusive virtual camera 513, switching means 514, and image processing means 515 are realized by the CPU 101.

According to the above-described operation in the present embodiment, when the taxi stops due to the pedal terminal 5b of the operation device 5, and the pedal terminal 5b is operated after the reverse movement is selected by the operation of the shift lever 5c, the CPU 101 moves to the reverse movement processing. The CPU 101 foremost operates the switching means 514 and switches the forward movement virtual camera 512 to the reverse movement exclusive virtual camera 513. Thereafter, the CPU 101 provides orders to the video block 51 for displaying reverse-movement images in accordance with the operation of the steering wheel 5a and pedal terminal 5b of the operation device 5. The video block 51 thereby forms pictures according to the operation of the steering wheel 5a and pedal terminal 5b and sends such pictures to the display 3. Then, shown on the display 3 are, for example, image 600 of FIG. 9A and image 601 of FIG. 9B.

Figure 9A:
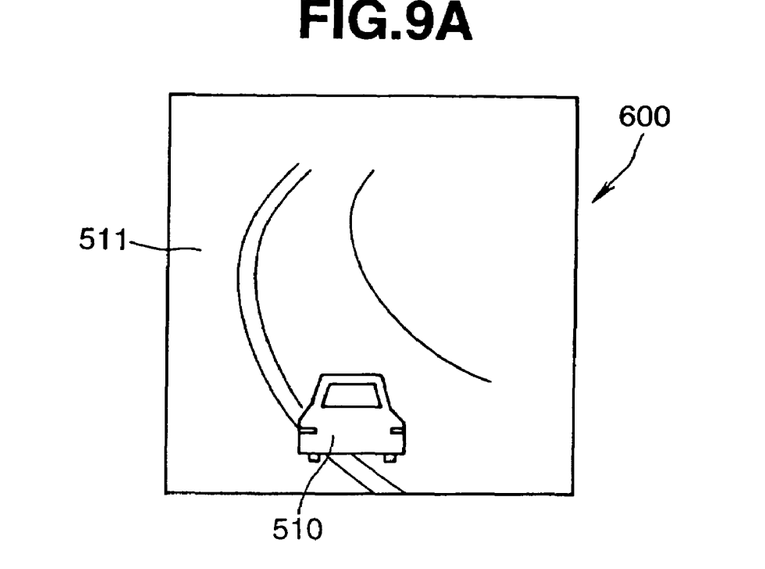
FIG. 9 is an explanatory diagram showing an example of the image obtained by the reverse movement exclusive virtual camera.
Figure 9B:
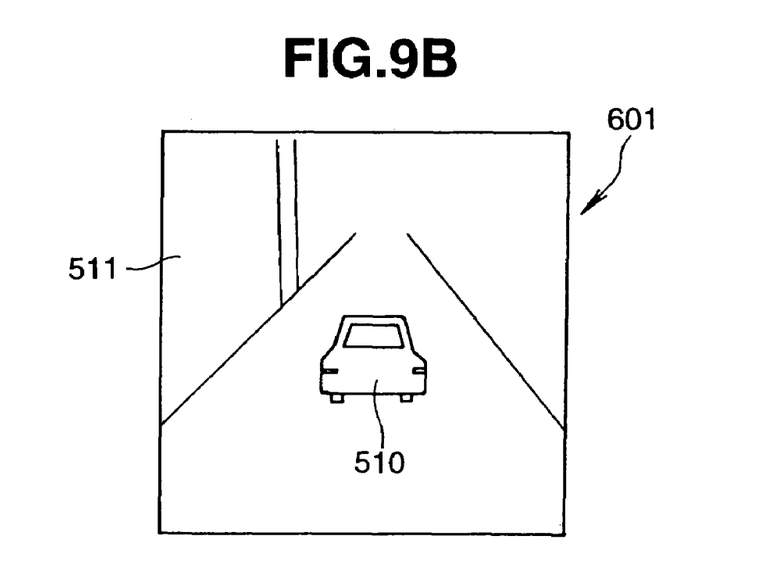

As such images are displayed on the display 3, it is possible for the player to easily drive the taxi in reverse whenever necessary. Moreover, in this embodiment, it is extremely easy to grasp the reverse-movement screen.

Figure 10:
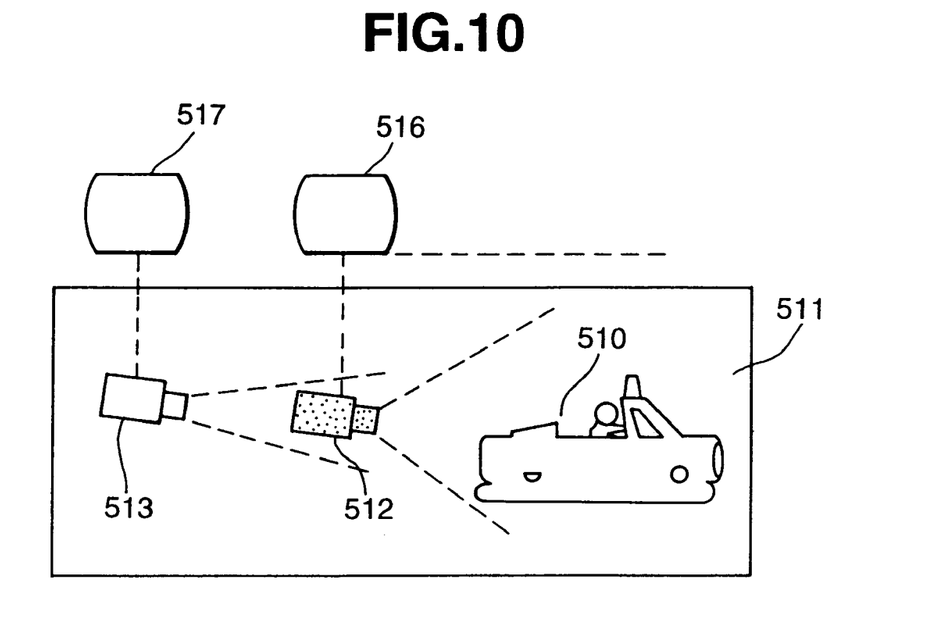
FIG. 10 is a conceptual diagram showing the relationship between the viewing angle adjustment means and the moving object, forward movement virtual camera and reverse movement exclusive virtual camera.

FIG. 10 is a conceptual diagram showing the viewing angle relationship of the forward movement virtual camera and the reverse movement exclusive virtual camera. In FIG. 10, the game device 1 arranges the taxi 510, which is the moving object, to the inside of the game space 511, and obtains picture information of a state where the taxi 510 moving inside the game space 511 is viewed with the forward movement virtual camera 512 from a prescribed viewpoint. Moreover, provided to the forward movement virtual camera 512 and reverse movement exclusive virtual camera 513 are first means 516 and second means 517 for moving the camera angle and camera position. This obtained picture information is displayed on the display 3 of the game device 1 pursuant to the game development.

Figure 11:
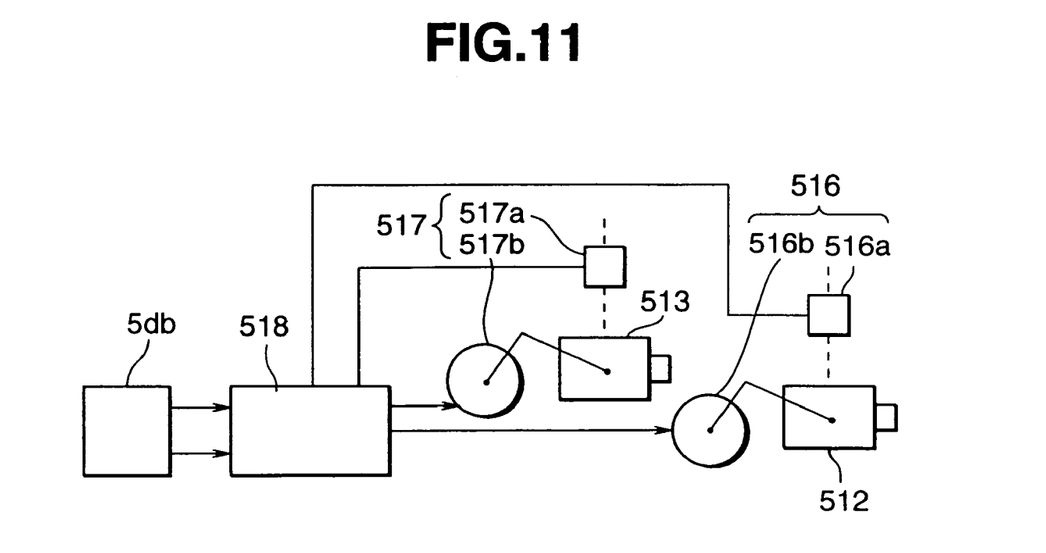
FIG. 11 is a conceptual diagram showing a structural example of the adjustment means.

FIG. 11 is a conceptual diagram of the operation system. In FIG. 11, the game device 1 is structured of a view-change switch 5*db* for adjusting the viewing angle, control means 518 for reading via the I/O interface 104 operation information from the view-change switch 5*db* and changing (adjusting) the viewing angle of the forward movement virtual camera 512 or reverse movement exclusive camera 513 pursuant to signals for changing the viewing angle, and first means 516 and second means 517 for changing the position and angle of the forward movement virtual camera 512 or reverse movement exclusive virtual camera 513 pursuant to the operation signals from the control means 518.

The first means 516 is structured of means 516*a* for changing the position of the forward movement virtual camera 512, and means 516*b* for changing the angle of the forward movement virtual camera 512.

The second means 517 is structured of means 517*a* for changing the position of the reverse movement exclusive virtual camera 513, and means 517*b* for changing the angle of the reverse movement exclusive virtual camera 513.

The aforementioned means 516, 517 and control means 518 realized in the game device 1 are realized by the CPU 101.

According to the present embodiment, as the forward movement virtual camera 512 and the reverse movement exclusive virtual camera 513 are capable of adjusting the viewing angle of the game space and objects to be displayed, the player may adjust such viewing angle pursuant to his/her preference. Thus, when seeking to obtain reality, the player may press the view-change switch 5*db* such that the viewing angle will become small. This enables the obtainment of realistic images.

On the other hand, when seeking to obtain a large, background view with increased sense of speed, the player may press the view-change switch 5*db* such that the viewing angle will become large. This enables the obtainment of images with increased sense, of speed.

Figure 12A:
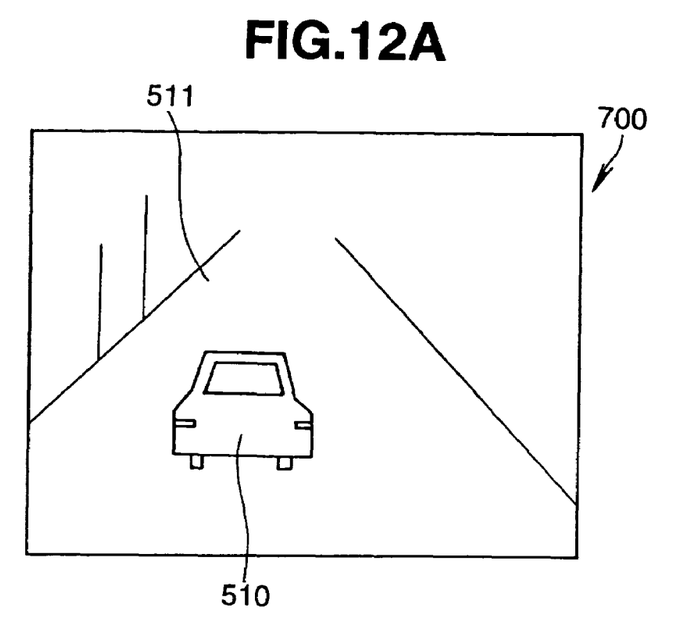
FIG. 12 is an explanatory diagram showing an example of the picture upon adjusting the viewing angle.

The image 700 obtained by the forward movement virtual camera 512 arranged as shown in FIG. 10 is displayed, for example, as shown in FIG. 12A. This image 700 is displayed with little front view.

Figure 12B:
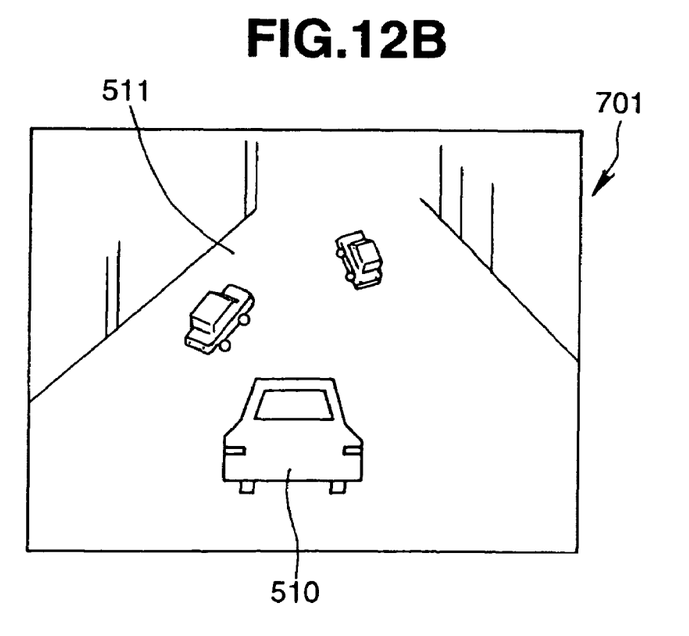

Contrarily, the image 701 obtained by the reverse movement exclusive virtual camera 513 set as per the aforementioned situation is displayed, for example, as shown in FIG. 12B. This image 701 is displayed with a better front view than the previous situation.

According to the present embodiment, the game may be progressed by increasing the viewing angle for enjoying the sense of speed and decreasing the viewing angle for enjoying the sense of reality pursuant to the player's preference. Thus, the player may enjoy the game with his/her preferred picture.

In the aforementioned embodiment, the moving object was a taxi but may of course be other moving objects. For example, it may be a truck driving game. In such case, the goal point may be changed in accordance with the cargo to be conveyed.

According to the aforementioned invention, as the goal point is not determined until the goal determining element is introduced to the moving object, and as the game is developed in consideration of the player's driving technique, the game development becomes complex, and enhances the amusement of the game.

Furthermore, according to the present invention, upon reverse movement, the player may easily and surely drive in reverse as a picture obtained from an exclusive camera position for forming the reverse movement image is displayed.

Moreover, according to the present invention, as the player may preferably set the viewing angle of the game screen, he/she may enjoy game images with a sense of speed and reality.

We claim:

1. A game device comprising manipulation means controlled by a player and image processing means that generates image data that is displayed on a monitor, the game device executing steps of:
   displaying on the monitor scenes including a vehicle moving in a virtual game space; and
   developing a game in which the vehicle moves toward a goal point set by execution of a game program in response to manipulation by the player with the manipulation means,
   wherein viewpoints are maintained at positions that show the rear of the vehicle and move with the vehicle as it travels so as to show the vehicle from its rear during the development of the game in which the vehicle moves toward the goal point, and
   wherein, in response to manipulation by the player with the manipulation means, a rear movement selection means moves the vehicle in reverse, and upon detection of reverse movement of the vehicle in the virtual game space, the viewpoint is switched to a position set higher in height and farther in distance from the vehicle than that set for the vehicle moving forward while the positions of the viewpoints are maintained to view the rear of the vehicle during the development of the game in which the player controls the movement of the vehicle moving toward the goal point.

2. A game device comprising manipulation means controlled by a player and image processing means that generates image data and control signals for displaying on a monitor, the game device executing steps of:
   displaying on the monitor scenes including a vehicle that moves in a virtual game space; and
   developing a game in which the vehicle moves toward a goal point set by execution of a game program in response to manipulation by the player with the manipulation means,
   wherein images of the vehicle are maintained to view the rear of the vehicle from a distance during the development of the game in which the vehicle moves toward the goal point,
   wherein, in response to manipulation by the player with the manipulation means, a rear movement selection means moves the vehicle in reverse, and upon detection of reverse movement of the vehicle in the virtual game space, the viewpoint moves to a position farther in the distance from the vehicle and higher in height from the viewpoint set for the vehicle moving forward while the positions of the viewpoints are maintained to view the rear of the vehicle during the development of the game in which the player controls the movement of the vehicle moving toward the goal point.

3. A game device comprising manipulation means controlled by a player and image processing means adapted to generate image data and control signals for displaying on a monitor, the game device executing steps of:
   displaying on the monitor scenes including a car vehicle moving in a virtual game space; and
   developing a driving game in which the car vehicle moves toward a goal point set by execution of a game program in response to manipulation by the player with the manipulation means, wherein images of the car vehicle are maintained to view the car vehicle from its rear from a distance during the development of the driving game in which the car vehicle moves toward the goal point, wherein, in response to manipulation by the player with the manipulation means, a rear movement selection means moves the car vehicle in reverse, and upon detection of reverse movement of the car vehicle in the virtual game space, the viewpoint moves to a position farther in the distance from the car vehicle and higher in height than the viewpoint set for the car vehicle moving forward while the positions of the viewpoints are maintained to view the rear of the car vehicle during the development of the game in which the player controls the movement of the car vehicle moving toward the goal point.

4. A computer-readable medium storing a game program executable on a computer, the game program executing a method, the method comprising steps of:

displaying on a monitor a vehicle moving in a virtual game space;

developing a game in which the vehicle moves toward a goal point set by execution of the game program in response to manipulation by the player with a manipulation means, wherein views of the vehicle on the monitor are maintained from viewpoints set at positions at the rear of the vehicle during the development of the game in which the vehicle moves toward the goal point; and switching the position of the viewpoint to a position higher in height and farther in distance from the vehicle than the position set for the vehicle moving forward upon detection of reverse movement of the vehicle in the virtual game space, the reverse movement occurring in response to manipulation by the player with the manipulation means that causes a rear movement selection means to move the vehicle in reverse, while the positions of the viewpoints are maintained to view the rear of the vehicle during the development of the game in which the player controls the movement of the vehicle moving toward the goal point.

5. A game device comprising manipulation means controlled by a player and image processing means that generates data that is displayed on a monitor, the game device executing steps of:

displaying on the monitor scenes of a taxi moving in a virtual game space; and developing a driving game in which the taxi moves toward a goal point set by execution of a game program in response to manipulation by the player with the manipulation means, wherein images of the taxi viewed from the rear are maintained during the development of the driving game so as to look down on the taxi from the rear while the taxi moves toward the goal point under control of the player, wherein, in response to manipulation by the player with the manipulation means, a rear movement selection means moves the taxi in reverse, and upon detection of reverse movement of the taxi in the virtual game space, the viewpoint moves to a position higher in height and farther in distance from the taxi than that set for the taxi moving forward while the positions of the viewpoints are maintained to view the rear of the vehicle during the development of the game in which the taxi moves toward the goal point under control of the player.

6. A computer-readable medium storing a game program executable on a computer, the game program executing a method, the method comprising steps of:

displaying on a monitor scenes including a vehicle moving in a virtual game space;

developing a game in which the vehicle moves toward a goal point set by execution the game program in response to signals from a manipulation means controlled by a player, wherein viewpoints that show the vehicle on the monitor are maintained at positions that are located at the rear of the vehicle and that follow movement of the vehicle during the development of the game in which the vehicle moves toward the goal point; and upon detection of reverse movement of the vehicle in the virtual game space, the reverse movement occurring in response to manipulation by the player with the manipulation means that causes a rear movement selection means to move the vehicle in reverse, moving the viewpoint to a position set farther in distance from the vehicle and higher in height than that set for the vehicle moving forward and maintaining the positions of the viewpoints to view the rear of the vehicle during the development of the game in which the vehicle moves toward the goal point under control of the player.

7. A computer-readable medium storing a game program executable on a computer, the game program executing a method, the method comprising steps of:

displaying on a monitor scenes including a taxi moving in a virtual game space;

developing a driving game in which the taxi moves toward a goal point set by execution the game program in response to signals from a manipulation means controlled by a player, wherein viewpoints that show the taxi on the monitor are maintained at positions that are located at the rear of the taxi and that follow movement of the taxi during the development of the game in which the taxi moves toward the goal point; and upon detection of reverse movement of the taxi in the virtual game space, the reverse movement occurring in response to manipulation by the player with the manipulation means that causes a rear movement selection means to move the taxi in reverse, moving the viewpoint to a position set farther in distance from the taxi and higher in height than that set for the taxi moving forward and maintaining the positions of the viewpoints to view the rear of the taxi during the development of the game in which the taxi moves toward the goal point under control of the player.

8. A computer-readable medium storing a game program executable on a computer, the game program executing a method, the method comprising steps of:

displaying on a monitor scenes in which a taxi cruises in a virtual game space in response to signals from a manipulation means controlled by a player;

determining a goal point by execution of the game program when a passenger boards the taxi in response to operation by the player on the manipulation means;

developing a driving game in which the taxi moves toward the goal point in response to operation by the player on the manipulation means; and displaying on the monitor scenes showing the taxi moving toward the goal point, wherein viewpoints showing the taxi are maintained so as to look down at the taxi from its rear and follow the taxi as the taxi moves in response to manipulations by the player during the development of the game in which the taxi moves toward the goal point, wherein the viewpoint is moved upon detection of reverse movement of the taxi in the virtual game space, the reverse movement occurring in response to manipulation by the player with the manipulation means that causes a rear movement selection means to move the taxi in reverse, the viewpoint being moved to a position set farther in distance from the taxi and higher in height than the position set for the taxi moving forward while maintaining viewpoints of the taxi from the rear during the development of the game in which the taxi moves toward the goal point.

* * * * *